United States Patent [19]
Barna

[11] Patent Number: 5,336,459
[45] Date of Patent: Aug. 9, 1994

[54] APPARATUS AND METHOD FOR FORMING A GAIT-SIMULATED IMPRESSION OF A FOOT

[76] Inventor: Randall Barna, P.O. Box 71, Bend, Oreg. 97709

[21] Appl. No.: 23,083

[22] Filed: Feb. 26, 1993

[51] Int. Cl.$^5$ .............................................. B29C 33/40
[52] U.S. Cl. ........................................ 264/223; 425/2; 425/425; 425/453
[58] Field of Search ............. 425/2, 185, 383, 425, 425/453; 264/222, 223, DIG. 30, 320

[56] References Cited

U.S. PATENT DOCUMENTS

| | | | |
|---|---|---|---|
| 2,154,169 | 4/1939 | Koehler | 425/2 |
| 2,333,481 | 11/1943 | Limmer | 425/2 |
| 4,521,171 | 6/1985 | Noonan, Jr. | 425/2 |
| 4,603,024 | 7/1986 | Denis | 264/223 |
| 4,716,662 | 1/1988 | Bar | 264/223 |
| 4,906,425 | 3/1990 | Poussou | 425/2 |

FOREIGN PATENT DOCUMENTS

| | | | |
|---|---|---|---|
| 28656 | of 1908 | United Kingdom | 264/223 |
| 943586 | 12/1963 | United Kingdom | 425/2 |

OTHER PUBLICATIONS

Riecken, Carl, "The Modern Orthotic Lab", date unknown, cover sheet and continued on video tape.
Hersco Arch Products Corp. and Smithers Bio-Medical Systems, "Hersco Presto-Cast" and Neutral Position Foam Casting with Bio-Foam, dates unknown, two instructional sheets of same technique.
Tekscan, Inc., "Introducing F-Scan$^R$, . . . " date unknown, company sales brochure.
Langer biomechanics Group, Inc., "Neutral Position Impression Casting Technique", 1988, instructional sheet.
Dennis Brown and Chris Smith, "Vacuum Casting for Foot Orthoses," Aug. 1976, Journal of American Podiatry Association.
Peterson Labs, "Peterson Bio Support", date unknown, instructional sheet.
Physical Support Systems, Inc., "Get Precise Information", Footmaxx TM Advertisement from Sep. 1991 Podiatry Today.
Amfit, Inc., "Amfit Presents", date unknown, company sales brochure.
Ski Business, "Foot Image Technology", Oct./Nov. 1990, from Product Update section.
Peter Foley for The Bulletin, "Bend Man Seeks to Ease Foot Pain," Dec. 12, 1991, newspaper article.

*Primary Examiner*—Jay H. Woo
*Assistant Examiner*—Robert B. Davis

[57] ABSTRACT

A method of forming a bodyweight supporting, pressure-equalized impression of the foot, generated by an apparatus that creates a dynamic state to the foot, simulating the gait cycle of human ambulation. The foot and impressionable material are placed on granular particles within a container. The container is mounted to a base with a turntable between them. A planar, elongate insert is partially inserted within the granular particles. The base has a guide pin that fits through an opening in the container into a track in the insert. The insert is removable by pulling and when the insert is removed the granular particles and accompanying foot shift to fill the volume previously occupied by the insert. The shifting movement begins at the heel of the foot and continues progressively past the toes. Also, as the insert is removed the container pivots on the turntable in adduction. The inserts track slides along the guide pin controlling the amount and timing of the twist. The impressionable material captures an impression of the foot as it progressively settles into a new supported position in a manner that simulates the human gait cycle.

15 Claims, 3 Drawing Sheets

APPARATUS AND METHOD FOR FORMING A GAIT-SIMULATED IMPRESSION OF A FOOT

BACKGROUND OF THE INVENTION

1. Field of Invention

The present invention relates in general to forming an impression of a foot for the modeling of footwear and foot appliances. More specifically, the present invention relates to forming a foot impression of a foot in a dynamic state that simulates the gait cycle that occurs in human ambulation.

2 Prior Art

It is desirable to form an impression of the human foot for making molds for footwear and foot-related appliances. It is a difficult task because of the foot's mobility and variety of tissue densities. A testament of this difficulty is the percentage of the population that are ironically intolerant of their footwear and appliances.

In order to provide background information so that the invention may be completely understood and appreciated in its proper context, reference is made to a number of prior art practices and patents as follows:

A common trade practice as taught by Langer Biomechanics Group of 12 E Industry Ct., Deer Park, N.Y. 11729, and others, molds the foot in plaster gauze and a technician holds the foot suspended in a position while the plaster cures. The method does not perform as the present invention because of the potential for inconsistencies in determining a position to hold the foot. Also, there is no weightbearing on the foot, which inherently would change the foot's shape compared to the suspended, non-weightbearing state.

Another common trade practice as marketed by Hersco Arch Products, 138 E 26th St., NYC, N.Y. 10010, and others, is to press the foot in a crystalline foam block that crushes and compresses to the pressures of the foot. The foot can be pressed into the block in a variety of manners, including one simulating the gait cycle; however, the method does not perform as the present invention because the crystalline foam gives way under very slight pressure; therefore, there is no support or resistance. If the foot is held and pressed lightly into the foam, the mold is essentially the same as the Langer suspended method. It likewise shares the faults of the Langer method. If the foot is not held and is allowed to press into the block with full weightbearing, the lack of resistance and support in the crystalline foam will allow the foot to spread into a flattened or incorrect position against the flat surface on which the block is resting.

Denis, U.S. Pat. No. 4,603,024 discloses molding of the foot in a block of modeling clay. The method does not perform as the present invention for the same reasons as Hersco and Langer. Although clay molds differently than crystalline foam, by viscously displacing as opposed to crushing, clay that is in a consistency to mold the foot will show the same faults in molding.

Another common trade practice, as marketed by Peterson Laboratories, One Mill St., Parish, N.Y. 13131, and others, makes an impression of the foot in a thin thermoplastic sheet while standing or being pressed on a foam cushion. The method does not perform as the present invention because compressed foam rubber cells are connected to adjoining cells and distort these adjoining cells, even if there is no direct pressure on the adjoining cells. This distortion creates uneven pressures on the surface of the foot and puts inaccurate contours into the mold. In addition to the inaccurate contours, inconsistencies will result with varied bodyweights on the same cushion.

Another common trade practice as marketed by Superfeet, 1852 Peace Portal Dr., Blaine, Wash. 98239 and N.W. Podiatric Laboratory, 1091 Fir Ave., Blaine, Wash. 98230, makes a mold or impression of the foot in thermoplastic or thermocork sheets or plaster gauze by applying the mold medium to the foot by vacuum-bag suction. The vacuum-bagged foot is then placed in a shoe or against a flat surface and held in a position until the mold medium cures. The method does not perform as the present invention, for the same reasons stated in the Langer case. Also, pressing the foot against a flat surface or shoe distorts the natural contour of the foot.

Another common trade practice as marketed by Riecken Orthotic Lab, 401 N. Green River Rd., Evansville, Ind. 47715, makes a mold of the foot in thermowax sheet by pressing, wiggling and digging the foot and accompanying mold medium into a box of sand. The method does not perform as the present invention, because the motions of the foot that force it into the sand are not normal ambulatory foot motions and create an unnatural and inaccurate contour.

Arefit of 1931 Las Plumas Ave., San Jose, Calif. 95133, computer images an impression of the foot by placing it on a bed of digitally read plunger rods that extend out of a flat surface. This method does not perform as the present invention for the same reasons as stated above for Hersco and Superfeet/N.W. Podiatric. Also, the foot contour is affected by the flat surface.

Foot Image Technology of 1620 SW Overturf, Bend, Oreg. 97702, computer images the foot with an optical image scanner while the foot is placed on a flat glass plate. This method does not perform as the present invention because the foot contour is affected by the flat glass plate. Also, for an image to be converted into a three-dimensional model, or mold, a designer/programmer must interpret the data from the image and convert this into tool paths. This interpretation is subject to error.

Tekscan of 451 D St., Boston, Mass. 02210, computer images the foot with a bed of force sensors placed on a flat surface and read by a computer. The foot may be applied to the bed in any manner, including gaited; however, the method does not perform as the present invention. The bed senses force-variance over the foot's surface, so three-dimensional surfaces are possible to image; however, as in the Foot Image Technology case, a programmer/designer must interpret the force levels into three-dimensional surfaces to create a model or mold. This interpretation is subject to error. Also, the foot contour is affected by its contact surface.

Whatever the precise merits, features and advantages of the above-cited references, none of them achieves or fulfills the purposes of the present invention. None of the above cited references generates a bodyweight supporting, pressure-equalized impression of the foot while it is dynamically functioning in a gait-simulated manner. All of the above cited references are subject to inaccurate impressions because of artificial influences such as designer's misinterpretations, technicians mis-held positions, flat impression or contact surfaces, distorted impression surfaces, over weightbearing or under weightbearing.

SUMMARY OF THE PRESENT INVENTION

It is an object of the present invention to achieve greater functional-accuracy and consistency in creating foot impressions for modeling of footwear and foot related appliances that generate user satisfaction.

Another object of the invention is to provide a method of forming a bodyweight-supporting, pressure-equalized impression of the foot generated by an apparatus that creates a dynamic state to the foot, simulating the gait cycle of human ambulation. The present invention accomplishes this objective by capturing an impression of the foot in a thin layer of impressionable material as the foot is moved in simulated ambulation. The ambulation is simulated on a gait simulation apparatus which comprises a container partially filled with granular particles and having a planar, elongate insert that is partially inserted within the granular particles. The insert is removable by pulling and when the insert is removed, the granular particles shift to fill the volume previously occupied by the insert. The subject foot and the impressionable material are placed on the gait simulation apparatus and bodyweight is applied to the foot. The apparatus supports the bodyweighted foot and impressionable material with granular particles in a loose state. Friction between the particles stabilizes and prevents movement. The insert is pulled out of the granular particles causing the particles, accompanying foot and impressionable material to shift as they fill the volume previously occupied by the insert. Friction between the particles is broken upon the shifting allowing the foot and mold material to progressively settle into a new supported position that provides a very even pressure upon the entire foot surface, regardless of tissue density. The movement of the foot simulates the human gait cycle characteristic of progressive heel to toe surface contact with a simultaneous adduction.

DESCRIPTION OF THE PREFERRED EMBODIMENT

Figure 1:
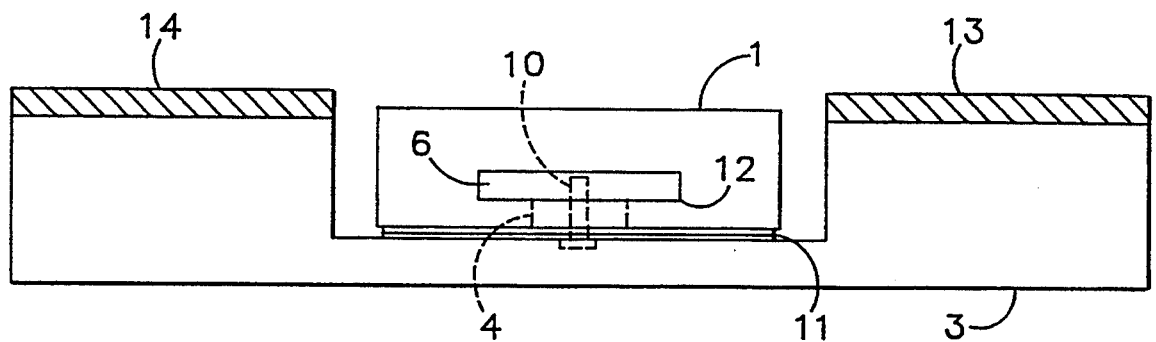
FIG. 1 is a front elevation view of the apparatus of the present invention to make an impression of a foot in a dynamic state that simulates the human gait cycle.

The preferred embodiment of the present invention will now be described in connection with FIGS. 1-6. With references now to the figures wherein like reference characters designate like or similar parts throughout the several views.

FIG. 1 is a front elevation view of the apparatus of the present invention to make an impression of a foot in a dynamic state that simulates the human gait cycle. The impression is done in the molding box 1 of the base platform 3. The base platform 3 is divided into three parts and is intended for the client, whose feet are the subject, to stand on. The client will stand on the top left side 13 of the base platform 3 while the right foot is placed on the central molding box 1. In turn, the client will stand on the top right side 14 of the base platform 3 while the left foot is placed on the central molding box 1. The two top sides 13 and 14 of the base platform 3 are at a higher elevation than the molding box 1 for the purpose of directing more weight to the foot on the molding box 1. The center of the base platform 3 has a molding box 1 containing granular particles 8 in a loose state (FIGS. 3 and 4), preferably silica sand in grade thirty. When a client's foot is gently placed on the leveled surface of the particles 8, the client will find that when weight is placed upon the foot, the particles 8 are firm and stable with very little deflection; so the surface of the particles 8 at the beginning remains essentially flat. This is believed to be due to friction between the granular particles 8. The present invention creates a downward vertical motion to the foot and particles 8 which begins at the heel and continuously progresses forward past the toes. The present invention also creates an adduction twist motion to the whole foot by internally pivoting the entire molding box 1 simultaneously along with the progressive downward vertical motion. The progressive heel-to-toe ground contact with simultaneous adduction twist is characteristic of a foot's motion during the human gait cycle. The part of the foot that is in motion is accompanied by the particles 8 that were initially supporting the foot. Once the particles 8 are put into motion, the initial friction between the granular particles 8 is broken, allowing the foot and particles 8 to settle together in a new anatomically supportive position. It is believed that because the particles 8 are in a loose state and have had the initial friction that binds them together broken, they are easily displaced by the pressure of the foot until the friction between the particles creates a uniform resistance that is equal to the pressure; a point upon which the motion of the foot ceases because it is supported with uniform pressure. The new anatomically supported position is generated progressively, beginning at the heel and continuing forward past the toes. The motion that the present invention generates in the foot, a downward vertical drop progressing from heel toward and past the toes with an adduction twist is considered a gait-simulated motion because, although the foot goes through the dynamics of its gait, the client remains in a stationary position on the base platform 3. This is so that an impression can be achieved that records the shape of the foot as it progressed through the gait-simulation.

Figure 2:
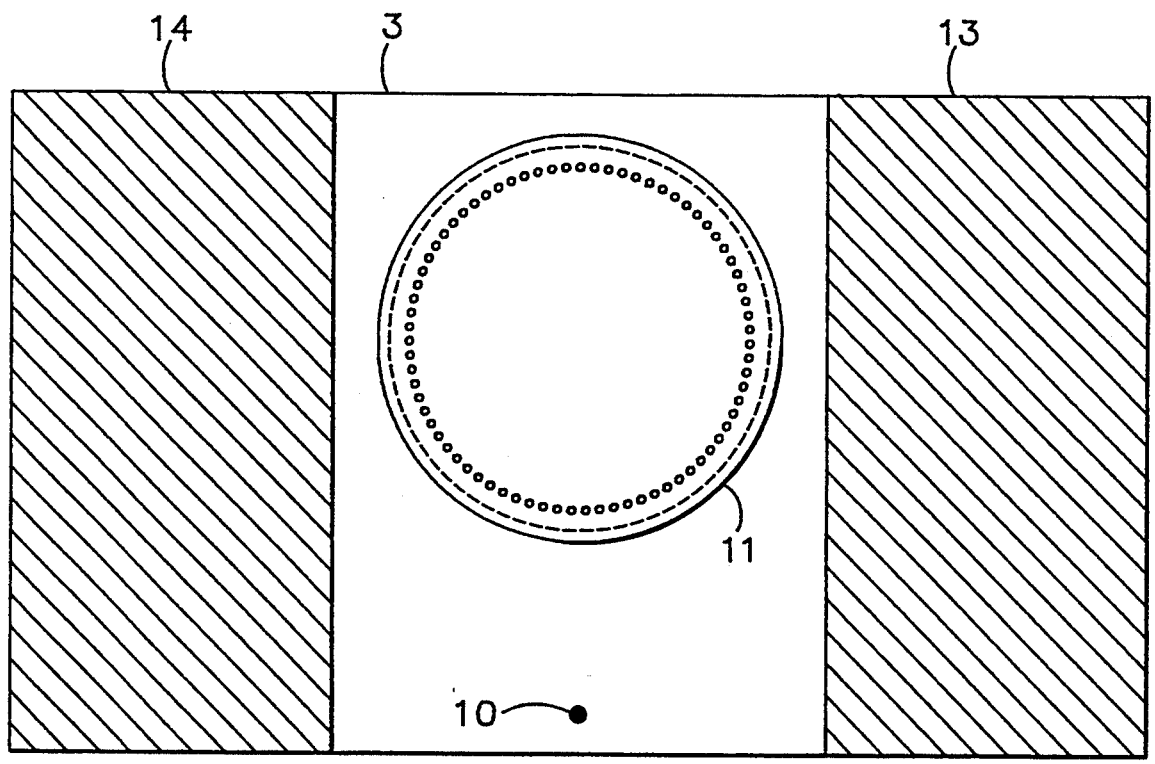
FIG. 2 is a plan view of the base platform of the above mentioned apparatus.
Figure 3:
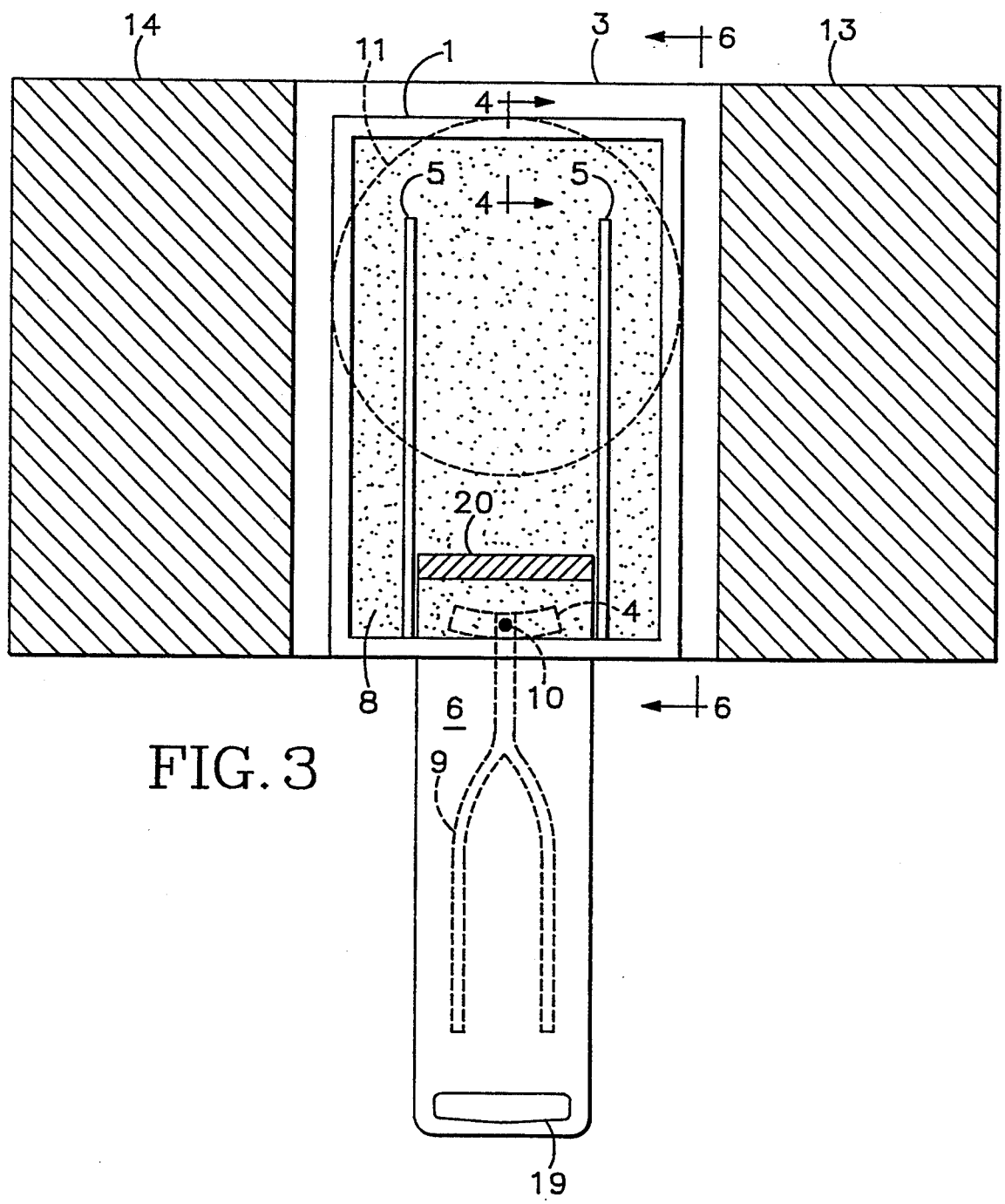
FIG. 3 is a plan view of the above mentioned apparatus.
Figure 4:
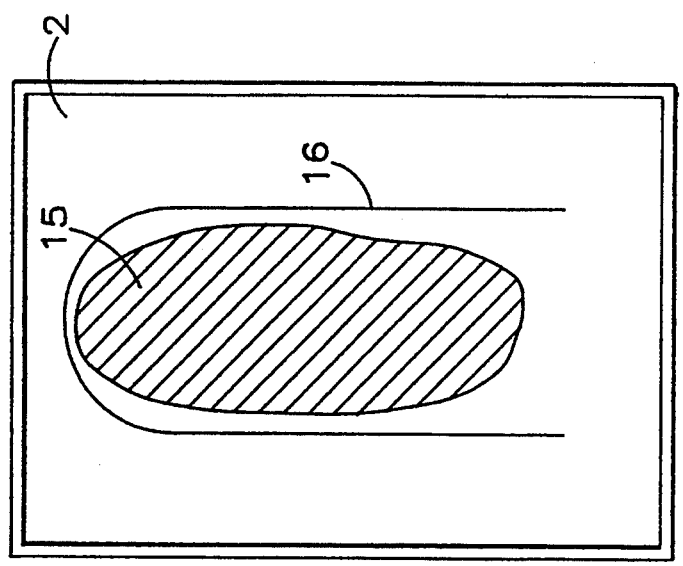
FIG. 4 is an exploded section view of the molding box of the above mentioned apparatus.
Figure 5:
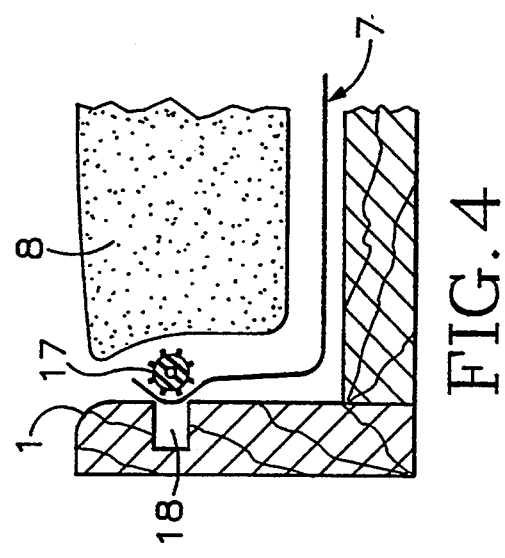
FIG. 5 is a plan view of the elastic lid of the above mentioned apparatus.
Figure 6:
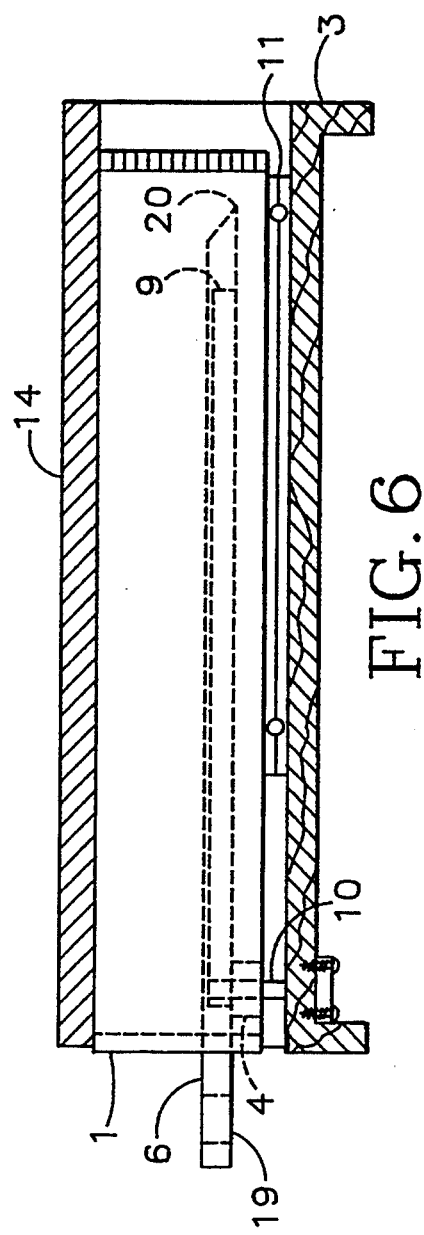
FIG. 6 is a side elevation view of the above mentioned apparatus, except for the left side of the base platform which is sectioned off.

A thin, uniform-thickness layer of impressionable material 15 that transforms into a hardened state is placed directly to the foots plantar surface. The foot is placed on the particles 8 of the present invention with the impressionable material 15 between the foot and the particles 8. When the gait-simulated motion occurs and the foot achieves a new anatomically supported position, the impressionable material 15 captures an impression of the foot and duplicates its exact position. To prevent particles 8 from clinging to the impressionable material 15, an elastic membrane 2 (FIG. 5) is used between the impressionable material 15 and the particles 8. The elastic membrane 2 is preferably of latex rubber and is mounted with a frame around its perimeter to form a convenient lid, that is placed upon the molding box 1. The elastic membrane 2 also has a U shaped marking 16 on its surface to indicate correct foot placement, directly above and to the rear of the sliding insert 6. Another membrane 7, is installed below the particles 8 to separate the particles 8 from the moving parts of the molding box 1. This is illustrated in FIG. 4. This separating membrane 7 is also flexible but is preferably made of low friction polyethylene film. It is adhered to the molding box by a spleen 17 into a groove 18 on an inside perimeter of the molding box 1. In the front of the molding box 1 is an opening 12 through which the sliding insert 6 is inserted. When completely inserted, only the handle end of the insert 6 extends from the molding box 1 (FIG. 6). This end has a cutout 19 that forms a handle so that one's hand may be inserted for a grip to pull out the sliding insert and generate the gait-simulated motion to the foot that is the subject. The sliding insert 6 is preferably about 0.75 inch thick and of high density polyethylene. The empty volume that is remaining at the end of the sliding insert 6 as it is extended out of the molding box 1 is what generates the vertical downward motion to the particles 8 and foot. The end 20 of the sliding insert 6 is beveled at a forty-five degree angle so that the foot is dropped gently and also so that the sliding insert 6 is easily slid back into the molding box 1. All top edges of the sliding insert 6 are rounded and smoothed to reduce friction. On the bottom surface of the sliding insert 6 a torsional tracking groove 9 is routed in the shape of a Y (FIG. 3). The torsional tracking groove 9 controls the adduction twist of the gait-simulated motion. A steel guide pin 10 is firmly mounted to the base structure 3 (FIG. 2). The guide pin 10 passes through a cutout 4 in the molding box 1 that is large enough to allow movement of the molding box 1 without the guide pin 10 touching the sides of the cutout 4. The guide pin 10 inserts through the cutout 4 in the molding box 1 into the tracking groove 9 on the sliding insert 6 (FIG. 6). The molding box 1 is mounted to the base platform 3 with a ball bearing turntable 11 between them (FIGS. 2 and 6). The pivot point of the turntable 11 is situated approximately where the ankle joint is positioned on the foot to be molded. When the sliding insert 6 that is inserted into the molding box 1 is put into motion, the tracking groove 9 that is snugly fitted over the fixed guide pin 10 controls the twist motion that will pivot the entire molding box on the low-friction turntable 11, thus inducing a twist motion to the foot that is on the molding box 1. When the insert 6 is inserted completely into the molding box 1, the guide pin 10 is at the end of either the right or left tip of the Y shaped tracking groove 9. The tips of the Y are one inch off center of the sliding insert 6 which produces approximately five degrees of toe-out angle when in the fully inserted position. At first motion of the sliding insert 6 the tracking groove 9 is straight, which allows the heel to drop simulating first heel strike, as motion progresses toward the mid-foot the guide pin 10 is in the curved section of the tracking groove 9 and has begun the internal adduction twist to the molding box 1. As the motion reaches the toes, the guide pin 10 is in the bottom, single-slot part of the tracking groove 9, which straightens out again for the final toe-off portion of the simulated gait, and ends the internal twist. The molding box 1 finishes the movement in a straight ahead angle with no toe-out. When the sliding false bottom 6 is returned to the molding box 1 in preparation for the other foot to be molded, the guide pin 10 is guided to the opposite tip of the Y tracking groove 9 to present the proper toe-out position for the other foot. To prevent any side-to-side movement of the sliding insert 6, lateral resistance blocks 5 (FIG. 3), are attached to the bottom of the molding box 1 on both sides of the sliding insert 6.

It is believed that the pressure-equalized, anatomically supported position that is achieved by the invention creating a vertical downward motion in a foot progressively from heel to toe combined with a simultaneous internal adduction twist will generate excellent functionally-accurate molds of the foot to model footwear and appliances that generate user satisfaction. It is also believed that the invention can produce results of high consistency because: 1) a standard amount of weight (natural bodyweight) is placed on the foot to be molded; 2) a standard amount of motion is generated in the foot; 3) there is no technician contact with the foot that could misplace its position; and 4) the procedure is simple, reducing the chances for technician error.

ALTERNATE EMBODIMENTS

An alternate embodiment of the invention would be as described in the preferred embodiment except for the twist motion being abduction instead of adduction.

Another alternative would be as described in the preferred embodiment except for the motion would begin at the toes and progress past the heel. Opposite of the motion in the preferred embodiment.

Another alternate embodiment would be as described in the preferred embodiment except eliminating any twist.

Another alternate embodiment would be as described in the preferred embodiment except the guide pin 10 would be a motor driven guide gear, and the tracking groove 9 would be toothed to mesh with the gear. In this alternative the movement of the insert would be motorized.

Six other alternate embodiments, as listed below, are as described in the preferred embodiment except for the manner of causing the particles 8 to shift and break their friction. Another exception would be that the twist motion, if included, would also need to be achieved in another manner. In the following six alternatives it is assumed that the twist motion, if included, is motorized with electronic on and off switches that coordinate the correct timing of the twist in the gait cycle.

1. Causing the particles 8 to shift when a device inserted within the particles expands or contracts. An example of this would be elastic air chambers.

2. Causing the particles 8 to shift when a device inserted within the particles 8 shrinks or stretches. An example would be a progressive stretch membrane.

3. Causing the particles 8 to shift when accordion folded slats that are inserted within the particles are progressively unfolded.

4. Causing the particles 8 to shift when devices that are inserted within the particles 8 are progressively agitated or vibrated.

5. Causing the particles 8 to shift when vertically mobile blocks, bars or pins that are inserted within the particles 8 are moved in a progressive pattern.

6. Causing the particles to shift when a wave is generated in a planar surface that is inserted within the particles.

Another alternate embodiment would involve comparison studies between foot impressions generated with the preferred embodiment of the present invention and three dimensional foot information generated with various apparatus on a computer. In this alternative a correction factor would be applied to the original computer information so that the corrected computer information would duplicate an impression generated on the preferred embodiment of the present invention.

Another alternate embodiment would be as described in the preferred embodiment except for the capturing of the foot impression would be accomplished by a multitude of three-dimensional computer sensors imbedded in the separating membrane 7.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. An apparatus for forming an impression of a foot, said apparatus comprising:
   (a) a frame;
   (b) a container having particulate matter therein and rotatably mounted to said frame;
   (c) an insert located so as to displace a quantity of particulate matter; and
   (d) whereby a foot is placed on said particulate matter and loaded in a direction toward said insert and said insert is moved, thereby causing said container to rotate and said particulate matter to shift and said foot to be relocated thereby forming an impression of said foot in said particulate matter.

2. The apparatus of claim 1 further having a sheet of impressionable material that overlies said particulate matter.

3. The apparatus of claim 1 wherein said particulate matter is silica sand.

4. The apparatus of claim 1 wherein the rotation of said container is in a direction to cause said foot to adduct.

5. The apparatus of claim 1 wherein the rotation of said container is in a direction to cause said foot to abduct.

6. The apparatus of claim 1 wherein said insert is a portion of said container.

7. The apparatus of claim 1 wherein said insert is located at least partially within said particulate matter and said movement of said insert comprises at least partially removing said insert from said particulate matter.

8. A method of forming an impression of a foot, comprising the steps of:
   (a) positioning a foot on particulate matter that is within a container wherein an insert is located so as to displace a quantity of said particulate matter; and
   (b) moving said insert thereby causing said particulate matter to shift and said foot to be relocated thereby forming an impression of said foot in said particulate matter.

9. The method of claim 8 further comprising the step of positioning a sheet of impressionable material between said foot and said particulate matter before moving said insert.

10. The method of claim 8 wherein a guide mechanism limits the movement of said insert to movement along a path of motion.

11. The method of claim 10 further comprising the step of selecting one path of motion appropriate for a left foot and another path of motion appropriate for a right foot.

12. The method of claim 8 wherein said moving step relocates a heel of said foot prior to relocating a toe of said foot.

13. The method of claim 8 wherein said moving step causes said foot to adduct.

14. The method of claim 8 wherein said moving step causes said foot to abduct.

15. An apparatus for forming an impression of a foot, said apparatus comprising:
   (a) a container having particulate matter therein;
   (b) a sheet of impressionable material overlying said particulate matter;
   (c) an insert located so as to displace a quantity of particulate matter and comprising a plurality of guide tracks;
   (d) a guide mechanism and a means for moving said container to align said guide mechanism with different said guide tracks; and
   (e) whereby a foot is placed on said sheet and loaded in a direction toward said insert, said insert is moved along a path of motion defined by said guide mechanism thereby causing said particulate matter to shift and said foot to be relocated thereby forming an impression of said foot on said sheet.

* * * * *